United States Patent [19]

Sewell et al.

[11] 4,342,474
[45] Aug. 3, 1982

[54] WAVEGUIDE HANGER

[75] Inventors: Donald N. Sewell, Raymond; Dwight A. Starbird, Casco, both of Me.

[73] Assignee: Microwave Techniques, Raymond, Me.

[21] Appl. No.: 203,069

[22] Filed: Nov. 3, 1980

[51] Int. Cl.³ .............................................. F16L 3/18
[52] U.S. Cl. .......................................... 285/61; 52/40;
52/573; 248/65; 248/219.4; 343/891
[58] Field of Search .................... 285/61; 248/65, 49,
248/218.4, 219.4, 201; 52/40, 645, 646, 573;
343/874, 905, 891

[56] References Cited

U.S. PATENT DOCUMENTS

| 311,166 | 1/1885 | Adams | 52/40 X |
|---|---|---|---|
| 1,291,529 | 1/1919 | Hutchinson | 54/40 X |
| 1,328,461 | 1/1920 | Strauss | 52/40 |
| 1,793,732 | 2/1931 | Bodendieck | 248/49 |
| 2,510,948 | 6/1950 | Beretta | 52/645 X |
| 2,899,159 | 8/1959 | Leblang | 248/49 |
| 2,945,231 | 7/1960 | Scheldorf | 343/891 X |
| 2,969,215 | 1/1961 | Weaver | 248/49 |
| 3,066,295 | 11/1962 | Krause et al. | 343/874 |

Primary Examiner—Ramon S. Britts
Assistant Examiner—Ramon O. Ramirez
Attorney, Agent, or Firm—W. R. Hulbert

[57] ABSTRACT

A suspension system for vertically mounting RF transmission line on a tower has stabilizing guides at spaced intervals to prevent lateral movement of the line while permitting vertical movement to accommodate differential thermal expansion and contraction. The line is suspended by a series of vertically spaced adjustable spring loaded arms to support the line vertically without lateral loading on the stabilizing guides.

6 Claims, 3 Drawing Figures

WAVEGUIDE HANGER

BACKGROUND OF THE INVENTION

In order to obtain maximum area coverage for programming, the RF broadcast industry usually places its transmitting antennas on tall towers, often in excess of 1,000 feet in height.

The RF power is directed from the transmitter at ground level to the antenna on the tower by connecting the two units to each other through a transmission line.

In order to attach a transmission line to the supporting tower, extreme care must be exercised to avoid over-stressing the transmission line due to differential thermal expansion between the transmission line and the support tower. Differential movement of ten (10) inches can be anticipated in a typical one thousand (1,000) foot system.

For example, one of the more common transmission lines, waveguide, currently requires a spring hanger for each vertical section (approximately twelve [12] feet) to provide vertical weight support and lateral movement restraint while allowing for differential expansion. These hangers are bulky, heavy, expensive, and require extensive mounting provisioning on the support tower. These units are also awkward to tension correctly on the transmission line, and due to their pivot arm geometry, they introduce undesirable motion as the transmission line expands or contracts vertically.

The object of the invention is to provide a less complex, less expensive method to support transmission line on towers, and to eliminate the undesired lateral motion.

Rather than individually supporting each transmission line section, the invention permits support of multiple transmission line sections each with a single spring hanger assembly. The design permits tower mounting at any convenient level. Structural integrity is enhanced by attachment to the transmission line at the flange joint rather than clamping to the thin, fragile transmission line wall as required by previous existing designs.

Furthermore, the lateral restraint system is separated from the vertical support system, which allows simple bands with wear buttons to be placed at convenient locations on the tower face, as required.

SHORT STATEMENT OF THE INVENTION

In accordance with the invention there is provided a system for hanging an RF transmission line vertically on a tower which comprises a series of vertically spaced support units mounted on the tower, each unit having at least one support arm protruding away from the tower and means for resiliently hinging such arm to the tower so that its free end can swing through an arc in a vertical plane; means for suspending the transmission line from the protruding arms so that each unit supports one or more transmission line sections (i.e., assumes its portion of the load) and can swing up or down with contraction or expansion of the transmissione line, and a series of stabilizing guides restraining the transmission line from lateral movement while permitting vertical movement thereof.

In a preferred embodiment, the transmission line comprises a waveguide of square cross-section and each of the spring hanger assemblies is provided with a pair of support arms which embrace the waveguide and wherein the suspending means connect each arm of each pair to the waveguide; the suspending means supports the waveguide beneath the joints between sections and the stabilizing guides engage the waveguide at locations between the joints; the suspending means may comprise cables; the hinging means comprises an adjustable leaf spring arrangement mounted on the tower in a manner to permit the support arm to swing vertically; the stabilizing guides may comprise bands affixed to the tower and surrounding the waveguide with a sliding fit so as to permit the waveguide to move vertically but not laterally, the bands being provided with wear buttons to provide anti-friction engagement with the waveguide to facilitate its movement.

Still further objects, features and advantages of the invention will become apparent from the following detailed description of a preferred embodiment thereof taken in conjunction with the accompanying drawings.

DETAILED DESCRIPTION OF PREFERRED EMBODIMENT

Figure 3:
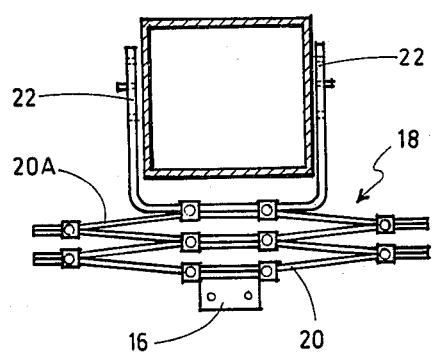
FIG. 3 is a cross section taken on line 3—3 of FIG. 1 showing means for hinging the supporting arms of the novel hanger to the tower.
Figure 2:
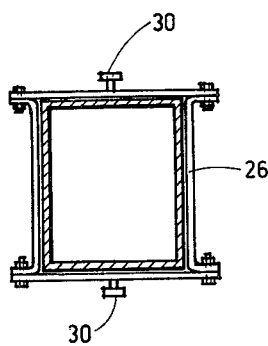
FIG. 2 is a cross section taken on line 2—2 of FIG. 1 showing how the guide is suspended by a band embracing it beneath a joint interconnecting waveguide sections.
Figure 1:
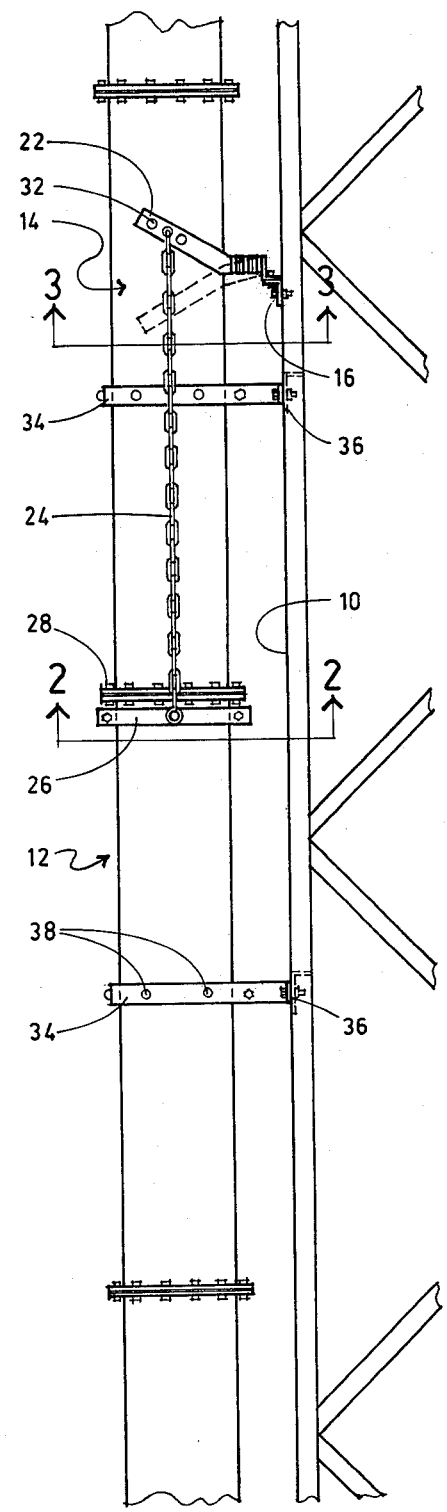
FIG. 1 is an elevation of a portion of a TV antenna tower showing one of the novel waveguide hangers supporting a waveguide thereon.

One face of a TV antenna tower is indicated generally by the numeral 10. Extending from the bottom to top of the tower is an RF transmission line in the form of waveguide 12 to carry RF energy to the antenna. The guide is fixed at its upper end to the top of the tower (not shown) and, consequently, it will undergo vertical motion, increasing in magnitude as it approaches the ground, due to expansion and contraction with temperature changes. To hang the guide on the tower a series of waveguide hangers 14 (only one shown) is attached to the tower at suitable vertical intervals by brackets 16 which are bolted to the tower face. Each hanger comprises, in addition to the bracket 16, a leaf spring assembly 18, the leaves 20 of which are arranged horizontally. To the outermost leaf 20A is bolted a U-shaped bracket defining a pair of opposed arms 22. It will be seen that the arms, due to the flexibility of the leaf spring, are free to swing up and down resiliently.

From each arm 22 hangs a chain 24 which, in turn, is connected to a band 26 which surrounds the waveguide 12 directly beneath one of the joints 28 between sections thereof. The chains may be readily attached to studs 30 on the structure 26 and the series of holes 32 in each arm 22 makes for ready adjustment of the chain suspension means to counterbalance the weight of the waveguide. Utilizing the holes nearest the ends of the arms permits a greater range of movement but provides less vertical support, and vice versa.

It will be seen that any desired number of hangers may be employed to suspend a waveguide of whatever length, depending on size of and weight of the waveguide and the strength of materials of the guide and of the hangers. The weight of the waveguide is removed from the single suspension point at the top of the tower and spread among the series of hangers. Adjustment is readily made of the lengths of suspending chains so that each arm 22 will be oriented generally horizontally at a preselected mean temperature and can swing upwardly or downwardly with contraction and expansion of the guide with change of temperature. The chain is of sufficient length to prevent lateral loading.

Lateral motion of the waveguide is prevented by means independent of the hangers conprising a series of stabilizing guides 34 which are bands loosely surrounding the guide at spaced intervals, each band being connected to the tower face, as indicated at 36. The waveguide may slip vertically within the bands which are provided with wear buttons 38 which slippably engage the guide.

While there has herein been disclosed and described a preferred embodiment of the invention, it will nevertheless be understood that the same is susceptible of modifications and changes and therefore it is intended that the scope of the invention be limited only by the proper interpretation to be afforded the appended claims.

I claim:

1. A system for hanging an RF transmission line vertically on a tower which comprises
    a series of vertically spaced support units mounted on the tower
    each unit having
        at least one support arm protruding away from the tower and
        means for resiliently hinging said arm to the tower so that its free end can swing vertically through an arc;
    means for suspending said transmission line from said protruding arms so that each arm assumes a portion of the load and can swing up or down with contraction or expansion of said line, and
    a series of stabilizing guides restraining said transmission line from lateral movement while permitting vertical movement thereof.

2. The system of claim 1 wherein said transmission line comprises a waveguide of square cross section and each of said units is provided with a pair of support arms which embrace the waveguide and wherein said suspending means connect each arm of each pair to said waveguide.

3. The system of claim 2 wherein said suspending means support said waveguide beneath the joints between the waveguide sections and said stabilizing guides engage said waveguide at locations between said joints.

4. The system of claim 3 wherein said suspending means comprises chains.

5. The system of claim 1 wherein said hinging means comprises a leaf spring mounted on said tower arranged to permit said arm to swing vertically through an arc.

6. The system of claim 2 wherein said stabilizing guides comprise bands affixed to said tower and surrounding said waveguide with a sliding fit so as to permit the waveguide to move vertically but not laterally.

* * * * *